Patented Mar. 10, 1953

2,631,131

UNITED STATES PATENT OFFICE 2,631,131

STABILIZED COMPOSITIONS CONTAINING SULFURIZED ESTERS OF TALL OIL

Stanley P. Waugh, Westfield, N. J., assignor to Tide Water Associated Oil Company, Bayonne, N. J., a corporation of Delaware No Drawing. Application April 19, 1950, Serial No. 156,940

21 Claims. (Cl. 252—32.7)

The present invention relates to novel compositions and, particularly, to mineral oil compositions containing sulfurized esters of tall oil useful as lubricants for various requirements, as well as concentrates adapted for preparation of such lubricants. In particular, the novel compositions find utility as cutting oils and, hence, the invention is described hereinafter with particular emphasis on such a utility for the compositions embodied therein.

As is known to those skilled in the art, the presence of sulfur in cutting oils is highly desirable and, particularly, for the reason that sulfurized oils retain their lubricating and cutting qualities better than unsulfurized oils during cutting operations. Since oils vary greatly in their ability to absorb and maintain sulfur in stable solution and/or combination, many oils do not possess the capacity of absorbing and maintaining in stable solution and/or combination a concentration of sulfur sufficient to perform in a highly satisfactory manner as cutting oils, particularly for use in heavy duty cutting operations. Hence, and as evidenced by the numerous investigations that have been made and on the basis of which many patents have been issued, the art has resorted to use of sulfurized bases for addition to mineral oils to provide cutting oil compositions. For such a purpose, the bases employed are normally characterized by having a high sulfur absorption capacity, e. g., a greater capacity for absorbing sulfur than the oil of lubricating quality with which the sulfurized base is blended to form cutting oil compositions.

Among the bases that have found application in cutting oils are products prepared by esterification of tall oil, a substance well-known to the art and obtained as a by-product in paper manufacturing. Esterified tall oils have a high sulfur absorbing capacity and, for that reason as well as for purposes of economy, have considerable merit for such usage. In illustration thereof, reference is made to sulfurized esterified tall oils and preparation of oil compositions therewith as disclosed in U. S. Patent No. 2,385,192.

Tall oil, either in crude or refined form, is characterized by containing fatty acids, rosin acids, and sterols. Depending upon the particular source from which the tall oil is obtained, and whether in crude or refined form, the proportions of the aforesaid constituents in tall oil may vary over a rather wide range. For example, in some instances the fatty acid content may vary between about 20 to about 60%, the rosin acids from about 70 to about 20%, with the remainder being sterols. In more specific illustration, the commercially available tall oil composition marketed as "Indusoil A" comprises 55 to 60% fatty acids, 34 to 38% rosin acids, and 6 to 10% sterols. The tall oils may be esterified by use of suitable esterifying agents, examples of which include glycerine, methanol, ethanol, propanol, and other alcohols, and the resulting esterified tall oil may be sulfurized by suitable means known to the art to incorporate sulfur therein, or for example, to incorporate from about 2 to about 25% sulfur based on the weight of the esterified tall oil. Although, for contemplated usage as a cutting oil base, esterified tall oils may in some cases be sulfurized to their maximum sulfur absorption capacity, sulfurization to such an extent sometimes provides substances that are insoluble when used in desired amounts in mineral oils or exhibit instability characteristics. Hence, and for contemplated usage as cutting oil bases, it is generally preferable to sulfurize esterified tall oils for absorption thereby of about 2 to about 25% by weight of sulfur, e. g., from about 5 to about 20%. Depending upon the particular cutting operation for which a cutting oil composition is to be employed, the amount of sulfurized esterified tall oil blended with a mineral oil of lubricating grade may be varied over a rather wide range. In illustration, the amount of sulfurized esterified tall oil employed may comprise from about 2 to about 50% by weight of the composition to provide cutting oil blends, the lower concentrations of the sulfurized base being normally used for light cutting operations with use of increasingly higher concentrations as the severity of the contemplated cutting operation increases.

Although esterified tall oils have considerable merit for sulfurization and blending of the sulfurized product with a mineral oil to provide cutting oil compositions, the use of such sulfurized esterified tall oils as cutting oil bases is attendant with certain drawbacks. In one form, such drawbacks arise from the tendency of sulfurized esterified tall oil compositions to form sludge and/or gum upon standing and/or during use thereof in cutting operations. In still another form, drawbacks arise from the tendency of the sulfurized esterified tall oil compositions to form difficultly removable adherent deposits on metals undergoing a cutting operation as well as on the metal cutting equipment with which the cutting oil is in contact. In addition to the foregoing, sulfurized esterified tall oil compositions often have another drawback in that they may exhibit a decided tendency to stain and/or discolor metals with which they are in contact. In certain instances, observation has shown that such staining occurs even before the cutting oil evidences breakdown by the occurrence of an appreciable amount of sludge and/or formation of a difficultly removable adherent deposit on the metals. Hence, and although esterified tall oils have considerable merit for sulfurization and use as cutting oil bases, the advantages resulting from use thereof are substantially minimized, if not oftentimes outweighed, by the aforesaid drawbacks. Thus, there is a need in the art for an improved cutting oil composition, in which a sulfurized esterified tall oil is employed, that is devoid of or inhibited against the normal tendency of such cutting oils to exhibit the aforesaid drawbacks which obviously retard the more extensive usage of sulfurized esterified tall oils in cutting oils. By the present invention, defined more fully hereinafter, such a need has been fulfilled by use, in combination with the sulfurized esterified tall oil compositions, of certain chemical compounds that inhibit the normal tendency of esterified sulfurized tall oils to exhibit the aforesaid drawbacks.

Generally speaking, and with respect to the aspect of this invention relating to compositions adaptable for use as cutting oils, such compositions comprise a mineral oil having dissolved therein a sulfurized esterified tall oil in an amount sufficient to improve the lubricating qualities of the oil and an oil-soluble metal salt of an ester of thiophosphoric acid in an amount sufficient to inhibit said composition against deterioration. More specifically, such compositions comprise the mineral oil in major amount based upon the weight of said composition. In still more specific embodiment, and particularly wherein use of the aforesaid metal salts in desired concentration may indicate insolubility or otherwise incompatible characteristics in the sulfurized esterified tall oil-mineral oil blends, the invention embodies use therein of an oil-soluble solubilizing agent for the metal salts, illustration of such agents being the metal soaps of sulfonic acids, such as the alkali and alkaline earth metal soaps of mahogany acids, suitable fatty oils, including sperm oil, and the like.

With reference to the mineral oil component of the novel compositions, a wide range of mineral oils may be used, the particular physical characteristics thereof being dependent upon the particular lubricating operations for which the composition is to be employed. Thus, the mineral oil component may comprise either a mineral oil or fraction thereof that possess lubricating qualities and which may be derived from any of a variety of petroleum crudes including paraffinic, naphthenic, and mixed crudes. In more specific aspect, and particularly for contemplated usage as a cutting oil, the lubricating oils employed preferably have a viscosity of from about 50 to 900 SUS and still more specifically from about 90 to about 300 SUS at 100° F. and a flash point of at least about 300° F. It should be understood, however, that although mineral oils having properties as aforesaid are particularly suitable, such properties have been set forth as illustrating suitable characteristics from a preferred and not limitative viewpoint as the invention embodies use of mineral oils of lubricating quality that, though they may not possess the aforesaid properties, are nevertheless suitable for use in a cutting oil for particular cutting operations or for other lubricating operations.

In preparing the compositions of this invention, the mineral oil component may be a mineral oil per se, fractions thereof, of mineral oils and fractions thereof that have been sulfurized. By use of sulfurized oils as the mineral oil component, certain advantages may be obtained, particularly in that blended compositions may generally be prepared that contain a higher concentration of sulfur in stable solution and/or combination than is obtainable if the mineral oil itself is not sulfurized or, for purposes of economy, certain advantages may result in using both a sulfurized mineral oil and a sulfurized esterified tall oil. In the use of a sulfurized mineral oil, any of the various methods known to the art for effecting absorption of sulfur by a mineral oil may be employed, a suitable illustration of which comprises mixing the oil with sulfur (e. g., sulfur flour) and heating the mixture with agitation at an elevated temperature such as 280 to 300° F. until the sulfur is in solution. The thus heated mixture is then allowed to cool to a normal temperature, e. g., about 70° F., and any sulfur that may precipitate out of solution may be removed by any suitable method e. g., filtration, to provide a mineral oil containing sulfur in stable solution and/or combination.

As indicated hereinabove, the component employed in combination with the sulfurized esterified tall oil-mineral oil blend or sulfurized esterified tall oil-sulfurized mineral oil blend to inhibit the tendency of the sulfurized esterified tall oil to exhibit the aforesaid drawbacks in an oil-soluble metal salt of an ester of thiophosphoric acid. More specific illustrations of such a component include the oil-soluble metal salts of esters such as cetyl thiophosphate, cetyl phenyl thiophosphate, lauryl thiophosphate, octadecyl thiophosphate, dicyclohexanyl thiophosphate, oleyl thiophosphate and the like. Especially suitable illustrations are the oil-soluble metal salts of thiophosphoric acids obtainable by reacting aliphatic cycloaliphatic or alkyl cycloaliphatic alcohols with phosphorus pentasulfide which apparently are di(alkyl, cycloaliphatic or alkyl cycloaliphatic) thioesters of phosphoric acids. The metal salts of such esters may be prepared by any suitable means therefor known to the art, suitable examples of which include simple neutralization of the esters with suitable salt forming bases or by double decomposition. A wide variety of salt forming radicals may be employed for practice of this invention but, for purposes of illustration without intent of limitation, suitable salt-forming radicals include those of metals such as zinc, barium, calcium and the like.

In order to further illustrate the invention, the following examples are set forth. In the examples, Example I represents a composition comprising a sulfurized tall oil and a sulfurized glyceryl ester of tall oil and Example II is similar to Example I except that a sulfurized methyl ester of tall oil was used instead of the glyceryl ester. The compositions of Examples I and II, which are devoid of a metal salt of a thiophosphate, illustrate the tendency of the sulfurized esterified tall oils to exhibit drawbacks as aforediscussed whereas the remaining examples represent compositions similar thereto but which in accordance with this invention contain a metal salt of a thiophosphate and illustrate the marked improvement imparted to such compositions by use of the metal salt in combination with the sulfurized esterified tall oil.

In the examples, sulfurized 100 pale oil represents 100 pale oil containing about 0.8–0.9% of elemental sulfur (sulfur flour) combined therewith. As employed in the examples, the sulfurized methyl esters of tall oil were prepared by admixing 15% by weight of sulfur flour with neutral methyl esters of tall oil marketed as "Metalyn" by Hercules Powder Co., Inc., and heating the mixture with agitation at 300 to 350° F. until the sulfur is combined. In a similar manner, the sulfurized glyceryl esters were prepared by use of glyceryl esters of tall oil marketed as "Estal 15–X" by Newport Industries, Inc.

With reference to the data in the following examples, the results set forth with respect to metal staining, sludging and adherent deposit-forming characteristics of each composition were determined by subjecting each composition to the following test:

A measured amount of the composition under test was placed in a metal (tin) cup containing a coiled strip of steel with a portion of the coiled strip immersed in the test composition. The test assembly was then placed in an oven maintained at 200° F. and the specimen observed at frequent intervals for evidence of metal staining, sludging and occurence of adherent difficultly removable deposits from the metal surfaces in contact with the test oil composition.

*Example I*

A composition was prepared comprising a blend by weight of 95% of sulfurized 100 pale oil and 5% of sulfurized glyceryl esters of tall oil. The composition, upon being subjected to the conditions of the aforesaid test, exhibited sludging and metal staining characteristics within 6 days and adherent deposit formation in 7 days, with increasing formation of adherent deposits upon continued exposure for at least 6 additional days under the conditions of the aforesaid test.

*Example II*

A composition was prepared comprising by weight 95% of sulfurized 100 pale oil and 5% of sulfurized neutral methyl esters of tall oil. The composition, upon being subjected to the conditions of the aforesaid test, exhibited sludging characteristics within 3 days, staining within 6 days, and adherent deposit formation within 9 days.

*Example III*

A composition was prepared comprising a blend by weight of the following ingredients: 92% of sulfurized 100 pale oil, 5% of sulfurized glyceryl esters of tall oil, and 3% of "Lubrizol 328" which is understood to comprise a mineral oil solution containing on the order of about 47 to 55% by weight of a zinc salt of di(alkyl cyclohexyl) dithiophosphates. When subjected to the aforesaid test, no formation of adherent deposits had occurred up to 12 days exposure.

*Example IV*

A composition was prepared comprising a blend by weight of the following ingredients: 92% of sulfurized 100 pale oil, 5% of sulfurized methyl esters of tall oil and 3% of "Lubrizol 328." When subjected to the aforesaid test, this composition was inhibited against sludging for fourteen days and no adherent deposit formation had occurred upon observation after 33 days exposure.

*Example V*

A composition was prepared comprising by weight 92% of sulfurized 100 pale oil, 5% of sulfurized glyceryl esters of tall oil, 1.5% of "Lubrizol 328" and 1.5% of "Petronate," the latter being a 60 to 65% solution of sodium salts of mahogany acids in mineral oil. When subjected to the aforesaid test, this composition was devoid of any indication of sludging, metal staining and adherent deposit formation characteristics upon observation after 19 days.

*Example VI*

A composition was prepared comprising by weight 92% of sulfurized 100 pale oil, 5% of sulfurized methyl esters of tall oil, 1.5% of "Lubrizol 328" and 1.5% of "Petronate." When subjected to the aforesaid test, this composition was devoid of any indication of sludging, metal staining and adherent deposit formation characteristics upon observation after 30 days exposure.

*Example VII*

A composition was prepared comprising a blend by weight of 92.5% of sulfurized 100 pale oil, 5% of sulfurized glyceryl esters of tall oils, 1.25% of "Aerolube 68" and 1.25% of "Petronate." "Aerolube 68" is understood to comprise a barium salt of thiophosphoric acid esterified with $C_6$–$C_8$ alcohols. When subjected to the aforesaid test, this composition was devoid of any indication of sludging, metal staining and adherent deposit formation characteristics upon observation after 34 days exposure.

*Example VIII*

A composition was prepared comprising a blend by weight of 92.5% of sulfurized 100 pale oil, 5% of sulfurized methyl ester of tall oil, 1.25% of "Aerolube 68" and 1.25% of "Petronate." When subjected to the aforesaid test, this composition was devoid of any indication of sludging, metal staining and adherent deposit formation characteristics upon observation after 34 days.

*Example IX*

A concentrate was prepared comprising by weight 61% of glyceryl esters of tall oil, 25% of sperm oil, and 14% of sulfur, the sulfur having been incorporated into said concentrate by admixing the aforesaid ingredients and heating the mixture at 200° F. for 3 to 4 hours.

Using the aforesaid concentrate, a composition was prepared comprising 95% by weight of sulfurized 100 pale oil and 5% of the concentrate. This composition, devoid of a metal salt of an ester of phosphoric acid, had formed an adherent deposit within ten days exposure to the aforesaid test conditions. However, when 0.5% of "Aerolube 68" and 0.5% of "Petronate" were dissolved in the composition, no indication of adherent deposit formation had occurred upon observation at 20 days exposure and when 1% of "Aerolube 68" and 1% of "Petronate" were added, no adherent deposits had formed and no indication of sludging had occurred upon observation after 25 days.

Although, as in the foregoing examples, specific concentrations have been employed for the various ingredients of the compositions set forth, such concentrations have been employed as illustrative of specific and not limitative aspects of the invention. As aforesaid, the invention with respect to compositions suitable for use as cutting oils relates to compositions comprising a mineral oil, a sulfurized esterified tall oil and an oil-soluble metal salt of an ester of thiophosphoric acid in an amount sufficient to stabilize the sulfurized esters in the manner aforesaid and, when desired, a solubilizing agent for the metal salts, said solubilizing agents being preferably an oil-soluble metal soap such as oil-soluble metal soaps of fatty acids, oil-soluble metal soaps of sulfonic acids e. g., petroleum mahogany acids, suitable fatty oils and the like. In more specific illustration, the compositions embodied herein comprise a mineral oil or sulfurized mineral oil, a sulfurized esterified tall oil in an amount of about 2 to about 50% based upon the weight of the composition and an oil-soluble metal salt of an ester of thiophosphoric acid in an amount sufficient to stabilize the composition as aforesaid, the metal salt normally being employed in concentrations of from about 0.1 to about 10% based upon the weight of the composition. In cases wherein the aforesaid metal salt indicates insolubility or otherwise incompatibility characteristics, the solubilizing agent should generally be employed in a concentration on the order set forth hereinbefore for the metal salt of the thiophosphate. Still more specific illustrations of compositions embodied herein are mineral oils or sulfurized mineral oils having the following concentrations of the sulfurized esterified tall oil and inhibitor dissolved therein:

| | Percent by Weight of Mineral Oil Compositions |
|---|---|
| Sulfurized esterified tall oil | About 2 to about 20. |
| Oil-soluble metal salt of an ester of thiophosphoric acid | About 0.1 to about 5.0. |

The compositions embodied herein may be prepared by separately adding the sulfurized base and inhibitors to the mineral oil or the sulfurized base and inhibitors may be added to the oil in the form of a concentrate. Hence, in addition to the novel oil compositions per se, the present invention also embodies as novel compositions concentrates comprising a sulfurized esterified tall oil in major proportion in combination with an amount of an oil-soluble metal salt of a thiophosphate sufficient to stabilize the sulfurized esterified tall oil as aforesaid. In illustration, such concentrates may usually comprise by weight more than 50% of sulfurized esterified tall oil (e. g., about 60 to about 80%), about 2 to 25% of an oil-soluble metal salt of a thiophosphate, and the balance may comprise a suitable diluent and/or solvent such as a liquid hydrocarbon, a mineral oil or fraction thereof, etc. In cases wherein it is desired to employ a solubilizing agent, the concentrate may suitably contain a concentration thereof of from about 2 to 20%. Hence, and in accordance with the present invention, concentrates may be provided that may be used to facilitate blending operations in preparation of suitable cutting oils and enable adjustable on-the-job preparation of such cutting oils to suit particular cutting needs that may vary as to severity of the cutting operation.

Although, and as is apparent from the foregoing description, the invention relates to compositions, adaptable for use as cutting oils that essentially contain a mineral oil, sulfurized esterified tall oil and an oil-soluble metal salt of an ester of thiophosphoric acid, as well as concentrates that contain a sulfurized esterified tall oil in combination with such a metal salt, it is within the scope of this invention to include compositions and concentrates that may contain, in addition to the aforesaid ingredients, other addition agents for imparting certain desired properties to the compositions. In illustration, the compositions embodied herein may contain substances such as anti-corrosives, scenting agents, germicides, diluents, etc. Thus, the term "consisting essentially of" as used in the claims herein is intended to refer to the components which are essential to the compositions, namely, the sulfurized tall oil ester and metal salt of the concentrate and sulfurized tall oil ester, metal salt and mineral oil of the oil composition in accordance with this invention, and the aforesaid term does not exclude other components from the compositions that do not render them unsuitable for the purposes disclosed herein.

Although the present invention has been described in conjunction with certain preferred embodiments thereof, those skilled in the art will readily recognize that variations and modifications are to be considered within the purview of the specification and scope of the appended claims.

I claim:

1. A composition consisting essentially of a mineral oil having dissolved therein a sulfurized esterified tall oil in an amount sufficient to improve the lubricating qualities of said oil but which has a tendency to form deposits adhesive to metals in contact therewith and an oil-soluble metal salt of an ester of thiophosphoric acid in an amount sufficient to inhibit said composition against said formation of metal-adhering deposits.

2. A composition, as defined in claim 1, which contains said sulfurized esterified tall oil in an amount of about 2 to about 50% based on the weight of said composition.

3. A composition, as defined in claim 1, which contains said metal salt in about 0.1 to about 10% based on the weight of said composition.

4. A composition, as defined in claim 1, wherein the mineral oil is a sulfurized mineral oil.

5. A composition, as defined in claim 1, which contains, in addition, an oil-soluble solubilizing agent for said metal salt 6. A composition consisting essentially of a mineral oil in major amount based on the weight of said composition, a sulfurized esterified tall oil in an amount sufficient to improve the lubricating qualities of said oil but which has a tendency to form deposits adherent to metals in contact therewith, and an oil-soluble metal salt of an ester of thiophosphoric acid in an amount sufficient to inhibit said composition against formation of adherent deposits on metals in contact therewith.

7. A composition, as defined in claim 6, wherein the mineral oil is a sulfurized mineral oil.

8. A composition, as defined in claim 6, which contains, in addition, an oil-soluble solubilizing agent for said metal salt.

9. A composition, as defined in claim 8, wherein the solubilizing agent is a metal soap of a petroleum mahogany acid.

10. A composition, as defined in claim 6, which contains the metal salt in an amount of about 0.1 to about 10% by weight of said composition.

11. A composition, as defined in claim 6, which contains the sulfurized esterified tall oil in about 2 to about 20% by weight of said composition.

12. A composition, as defined in claim 6, wherein the mineral oil is a sulfurized mineral oil and said composition contains about 2 to about 20% by weight of sulfurized esterified tall oil and about 0.1 to about 10% by weight of said metal salt.

13. A composition, as defined in claim 12, which in addition, contains an oil-soluble solubilizing agent for said metal salt.

14. As a new composition, a mineral oil of lubricating grade having dissolved therein about 2 to about 20% by weight of a sulfurized ester of tall oil and about 0.1 to about 5.0% by weight of an oil-soluble metal salt of an alkyl ester of thiophosphoric acid.

15. A concentrate, adapted for use as an additive for lubricating mineral oils to produce improved cutting oil compositions, comprising an oil-soluble sulfurized ester of tall oil in major amount based on the weight of said concentrate and an oil-soluble metal salt of an ester of thiophosphoric acid in an amount sufficient to inhibit the tendency of said sulfurized ester to deteriorate and form adherent deposits on metals in contact therewith.

16. A concentrate, adapted for use as an additive for lubricating mineral oils to produce improved cutting oil compositions, comprising an oil-soluble sulfurized ester of tall oil in major amount based on the weight of said concentrate, an oil-soluble metal salt of an ester of thiophosphoric acid in an amount sufficient to inhibit the tendency of said sulfurized ester to deteriorate and form adherent deposits on metals in contact therewith, and a mineral oil.

17. A concentrate, as defined in claim 16, which in addition, contains an oil-soluble solubilizing agent for said metal salt.

18. A composition consisting essentially of a mineral oil in major amount based on the weight of the composition having dissolved therein a sulfurized tall oil ester in an amount sufficient to improve the lubricating qualities of said oil but which has a tendency to form deposits adherent to metals in contact therewith, said sulfurized ester being a member from the group consisting of sulfurized glyceryl esters of tall oil and sulfurized methyl esters of tall oil, and an oil-soluble metal salt of an ester of thiophosphoric acid in an amount sufficient to inhibit said composition against said formation of metal-adherent deposits, said metal salt being characterized in that the metal component thereof is a member from the group consisting of zinc and barium.

19. A composition, as defined in claim 18, which, in addition, contains a sodium salt of petroleum mahogany acids.

20. A composition, as defined in claim 18, wherein the ester of thiophosphoric acid is an aliphatic thiophosphate 21. A composition, as defined in claim 20, wherein the mineral oil is a sulfurized mineral oil.

STANLEY P. WAUGH.

REFERENCES CITED

The following references are of record in the file of this patent:

UNITED STATES PATENTS

| Number | Name | Date |
| --- | --- | --- |
| 2,364,284 | Freuler | Dec. 5, 1944 |
| 2,385,912 | Davis | Oct. 2, 1945 |
| 2,480,666 | Morway et al. | Aug. 30, 1949 |